United States Patent [19]

Hu et al.

[11] Patent Number: 5,459,579
[45] Date of Patent: Oct. 17, 1995

[54] MULTIFUNCTIONAL DOCUMENT PROCESSING SYSTEM FOR RECEIVING DOCUMENT SIGNALS FROM A LOCAL OR A REMOTE DEVICE

[75] Inventors: Darwin Hu, San Jose, Calif.; Keisaku Kano, Marlton; John J. Ring, Cherry Hill, both of N.J.

[73] Assignee: Oki America, Inc., Hackensack, N.J.

[21] Appl. No.: 71,864

[22] Filed: Jun. 3, 1993

Related U.S. Application Data

[63] Continuation of Ser. No. 746,831, Aug. 19, 1991, abandoned.

[51] Int. Cl.⁶ .............................. H04N 1/00; H04N 1/32; H04N 1/40
[52] U.S. Cl. .......................... 358/296; 358/401; 358/434; 358/444
[58] Field of Search ..................... 358/296, 401, 358/403, 407, 434, 444, 468; 355/202, 204; 400/70, 692; 395/110, 115

[56] References Cited

U.S. PATENT DOCUMENTS

| | | | |
|---|---|---|---|
| 4,268,157 | 5/1981 | Ebi et al. | 355/3 TR |
| 4,424,524 | 1/1984 | Daniele | 346/160 |
| 4,652,933 | 3/1987 | Koshiishi | 358/256 |
| 4,660,999 | 4/1987 | Tsuneki | 400/121 |
| 4,754,300 | 6/1988 | Fukae | 355/3 R |
| 4,794,419 | 12/1988 | Shibazaki et al. | 355/3 R |
| 4,814,798 | 3/1989 | Fukae et al. | 346/160 |
| 4,821,107 | 4/1989 | Naito et al. | 358/256 |
| 4,860,115 | 8/1989 | Ogura | 358/443 |
| 4,876,609 | 10/1989 | Ogura | 358/443 |
| 4,905,098 | 2/1990 | Sakata | 358/468 |
| 4,910,607 | 3/1990 | Kita et al. | 358/400 |
| 4,914,525 | 4/1990 | Abe et al. | 358/498 |
| 4,947,345 | 8/1990 | Paradise et al. | 364/519 |
| 4,959,731 | 9/1990 | Fukae | 358/300 |
| 4,964,154 | 10/1990 | Shimotono | 379/100 |
| 4,992,884 | 2/1991 | Sakata | 358/401 |
| 5,091,747 | 2/1992 | Tsai | 355/202 |

FOREIGN PATENT DOCUMENTS

| | | | |
|---|---|---|---|
| 0048118 | 3/1982 | European Pat. Off. | H04N 1/02 |
| 0262603 | 4/1988 | European Pat. Off. | H04N 1/32 |
| 0426412 | 5/1991 | European Pat. Off. | H04N 1/32 |
| 57-8561 | 1/1982 | Japan . | |
| 59-12668 | 1/1984 | Japan . | |
| 60-51065 | 3/1985 | Japan . | |
| 2217261 | 10/1989 | United Kingdom | G03G 15/00 |

*Primary Examiner*—Kristine L. Kincaid
*Assistant Examiner*—Eric Frahm
*Attorney, Agent, or Firm*—Panitch Schwarze Jacobs & Nadel

[57] ABSTRACT

A multifunctional document processing system receives document signals from a local or a remote device and processes the document signals utilizing a host computer for transmission to the local or remote device. The system has a multifunctional local peripheral device which includes a scanner for optically scanning document information, for converting the scanned document information into electrical document signals and for transmitting the document signals to the host computer. The multifunctional local peripheral device also includes a recording device, such as a printer for receiving document signals from the host computer and for producing a recorded form of the document information, such as a printed document based on the received document signals. A control module is interfaced between the host computer and the multifunctional local peripheral device for receiving document signals from the multifunctional local peripheral device and from the remote device and for sending the received documents signals to the host computer. The control module also receives document signals from the host computer and sends the received document signals to either the multifunctional local peripheral device or the remote device. The control module additionally generates and transmits control signals to the multifunctional local peripheral device.

11 Claims, 5 Drawing Sheets

MULTIFUNCTIONAL DOCUMENT PROCESSING SYSTEM FOR RECEIVING DOCUMENT SIGNALS FROM A LOCAL OR A REMOTE DEVICE

This is a continuation of application Ser. No. 07/746,831, filed Aug. 19, 1991 now abandoned.

BACKGROUND OF THE INVENTION

The present invention relates to a multifunctional document processing system and, more particularly, to a multifunctional document processing system which may be used with a host computer for scanning, faxing, printing and copying document information utilizing a single peripheral unit.

Most modern offices have separate machines for scanning documents, sending and receiving faxes, printing documents and copying documents. Each such separate machine is restricted to its own particular function and occupies a predetermined amount of office space. If a document is to be faxed to a remote location and additional copies of the document are to be made, a facsimile machine must be used to fax a copy of the document to the remote location and a separate copier must be used to make additional copies of the document. The use of two separate machines to accomplish relatively similar functions can be time consuming, particularly if each machine is located in a different part of the office. In addition, the use of two machines can be expensive to acquire and maintain and often requires twice as much office space as a machine which could perform both functions.

In addition, many offices use word processors or personal computers (hereinafter collectively referred to as a personal computer) to create and edit documents. A separate printer, such as a laser printer, LED printer, etc., is usually associated with the personal computer so that printed copies of documents may be obtained from the personal computer. A copy of each of the documents is normally also stored within a hard disk or other long term storage device of the personal computer or on a separate floppy disk so that the document can be retrieved at a later point in time if additional copies of the document are needed or to permit editing of the document. If the document is to be edited or revised, the document is retrieved from the memory of the personal computer and the changes are made. A printed copy of the revised version of the document can then be obtained by entering the appropriate instructions into the personal computer for activating the printer to print a copy of the document.

Most other office machines, such as fax machines, copiers and optical scanners are incapable of creating or revising a document. Such machines are only capable of accepting documents which are in final form and, in the case of a fax machine, normally must be printed on a type of paper suitable for faxing. For example, if a document is to be faxed to a remote location and, prior to faxing, the document must be changed the document must be retrieved from the memory of the personal computer, revised, and reprinted on the printer before it is ready be supplied to the fax machine to be faxed. This multi-step, multi-machine operation can be a time consuming process which can ultimately lower the efficiency of an office.

There is a strong need for a single apparatus or device which is capable of functioning in conjunction with a host computer for scanning, faxing, printing and copying a document. In addition, there is a need for an apparatus or device which is capable of editing a document prior to scanning, faxing, printing or copying the document. There is also a need for a system which can ensure confidentiality of documents such that access to the documents is limited to an identified person or a group of identified persons. The apparatus or device should preferably be compact so that the device can be maintained on a desk top and the device must be capable of producing a high quality printed copies acceptable for business purposes.

The present invention is directed to a multifunctional document processing system which is capable of scanning, faxing, copying or printing a document. Document information is converted into electrical document signals and is transmitted by a local or remote device to a host computer. The host computer processes the document signals and transmits document signals to the local or remote device. The local or remote device then performs the desired function, i.e., either scanning, faxing, printing or copying the requested document. The local and remote device are interfaced with the host computer by a control module which communicates to and from the local or remote device and the host computer.

The multifunctional data processing system of the present invention is user friendly and can be employed for accomplishing a variety of tasks. For example, if a user wanted to prepare a resume and incorporate a photograph, the text portion of the resume can be prepared utilizing the word processing features of the host computer and the photograph can be scanned into the host computer utilizing the scanner on the multifunctional document processing system. The host computer can then integrate the photograph with the text and the resulting resume can be printed on the printer of the multifunctional document processing system. In addition, a previously printed paper which is not stored in the host computer can be updated or changed by scanning the paper into the host computer using the scanner. The changes can then be made to the paper utilizing the word processing features of the host computer and the revised document can be printed out on the printer of the multifunctional document processing system. The system also permits a single document stored within the memory of the host computer to be sequentially faxed to multiple fax machines at multiple remote locations utilizing fax software within the host computer. Incoming faxes which are received by the system are stored in the memory of the host computer for later printout. The system provides for identified fax documents to be stored in specifically identified memory locations (i.e., mailboxes) within the host computer for later retrieval and/or printout only by a particular person to whom the fax is addressed under the control of a particular security code or password. The system also permits the addressee of a fax to retrieve the fax from a remote location utilizing another fax machine or another multifunctional document processing system. It is clear that the system of the present invention is more versatile and is able to perform additional tasks or functions which could not be readily performed utilizing a separate printer, scanner and/or fax machine as is done with the prior art.

SUMMARY OF THE INVENTION

Briefly stated, the present invention is directed to a multifunctional document processing system for receiving document signals from a local or remote device and processing the document signals utilizing a host computer for transmission to the local or remote device. The document processing system comprises a multifunctional local peripheral device which includes scanning means for optically scanning document information, for converting the scanned document information into electrical document signals and for transmitting the document signals to the host computer. The multifunctional local peripheral device also includes recording means for receiving document signals from the host computer and for producing a recorded form of the document information based on the received document signals. A control module interfaced between the host computer and the multifunctional local peripheral device receives the document signals from the multifunctional local peripheral device and from the remote device over a communication medium. The control module sends the received document signals to the host computer. The control module also receives document signals from the host computer and sends the received document signals to either the multifunctional local peripheral device or the remote device over the communication medium. The control module further functions to generate and transmit control signals to the multifunctional local peripheral device.

BRIEF DESCRIPTION OF THE DRAWING

The foregoing summary, as well as the following detailed description of the preferred embodiments, will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawings.

DESCRIPTION OF THE PREFERRED EMBODIMENT

Figure 1:
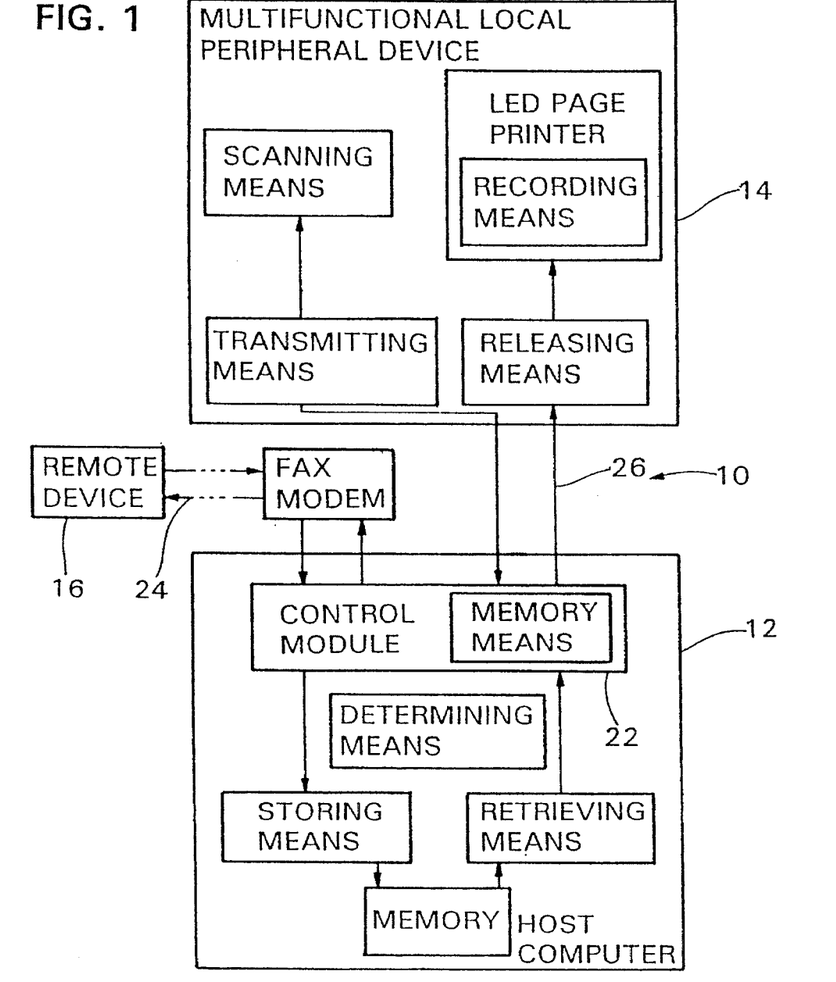
FIG. 1 is a schematic block diagram of a preferred embodiment of a document processing system in accordance with the present invention.
Figure 2:
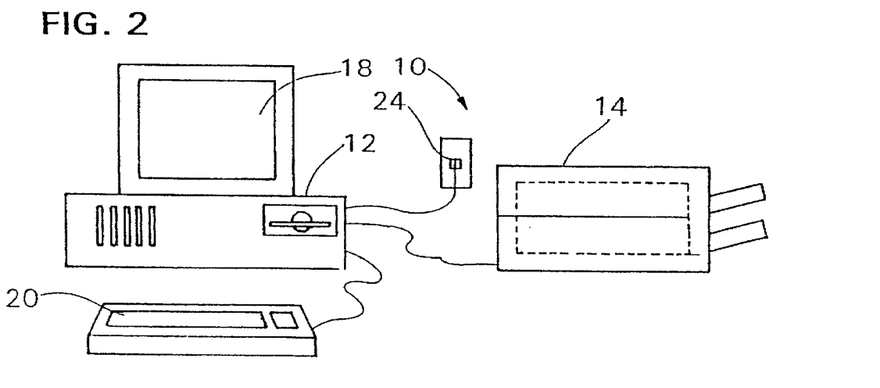
FIG. 2 is an elevational view of a typical personal or host computer and a multifunctional local peripheral device of the document processing system of FIG. 1.

Referring to the drawings wherein like numerals indicate like elements throughout, there is shown in FIGS. 1 and 2, an embodiment of a document processing system 10 in accordance with the present invention. The document processing system 10 comprises a host computer 12 which receives document signals from a local device 14 or a remote device 16, and processes the document signals for transmission of the document signals to the local device 14 or the remote device 16. The host computer 12 which is illustrated in FIG. 2 is preferably a personal computer, such as, but not limited to, an IBM or an IBM compatible computer. It is to be understood by those skilled in the art that any other brand or type of computer system, word processing system, whether networked or stand alone, or any other type of related device could be used in conjunction with the document processing system 10 without departing from the spirit and scope of the present invention. The terms personal computer and host computer are used herein only for the sake of brevity and should not be considered a limitation on the present invention.

The host computer 12 as illustrated includes a hard disk (not shown) as well as a main memory (not shown) which together act as the main storage data facility or memory 101 of the host computer 12 in the usual manner well-known in the art. As should be understood, storing means 115 and retrieving means 117 are employed to respectively store and retrieve data from the memory 101.

Document signals received from the local device 14 and the remote device 16 are stored within the memory 101 of the host computer 12 until the signals are retrieved and processed. Auxiliary storage devices, such as floppy discs or the like can also be used to store the document signals received from the local device 14 or the remote device 16 for later processing of the document signals.

The host computer 12 can include a visual display device 18, such as a CRT, for displaying a document on-line. A user of the document processing system 10 can retrieve document signals from the memory of the host computer 12 and can display the document on the visual display device 18 for editing or otherwise changing the document. In addition, a keyboard 20 can be associated with the host computer 12 for creating and revising documents which can be stored within the memory. The keyboard 20 may also be used for inputting instruction commands to the local device 14. It is to be understood by those skilled in the art that any form of editing or creating device can be also used in conjunction with the host computer 12, such as, but not limited to, a touch screen, a laser pen, a mouse or the like.

The host computer 12 is interfaced with a control module 22 which passes document signals between the host computer 12 and the local device 14 or the remote device 16. The control module 22 is preferably a self-contained plug-in printed circuit board or card which can be conveniently inserted within an available port (not shown) within the host computer 12. The control module 22 is an intelligent controller which controls all communication, printer emulation, printer, scanner and fax functions within the document processing system 10. The control module 22 comprises a processor (not shown) which is preferably a 32 bit processor, such as an Intel 80960 processor, and memory means 113. The processor can also be a 16-bit or a 64-bit processor. The processor receives document signals from the host computer 12 and determines the function which is to be performed to the document signals, i.e., print, fax, etc., and the destination of the document signals, i.e., to the local device 14 or to the remote device 16 via determining means 103. The functions which can be performed by the document signals are scanning a document, faxing a document to a remote location, receiving a document faxed from a remote location, copying a document, and printing a document.

The system 10 further includes a facsimile modem 105 for transmitting or receiving facsimiles to or from a remote location via the remote device 16 which in the present embodiment is a remotely located fax machine or the same configured multifunctional document processing system. The facsimile modem operates in the usual well-known manner to transmit documents over a communicating medium 24, such as the public switched telephone network and comprises 16 8-bit control registers. If the document signals received by the control module processor are to be faxed to the remote device 16 or have been received from the remote device 16, the processor accesses the facsimile modem for proper transmission and reception of the document signals. The processor accesses the control registers of the facsimile modem through an 8-bit parallel port (not shown). The parallel port transfers transmitting document signals and receiving document signals in an 8-bit data format.

As discussed above, the control module 22 controls all printer, scanner and fax functions. When the control module 22 receives document signals from the host computer 12, the control module 22 first identifies via the determining means 103 what function is to be performed and at what destination. In the preferred embodiment, the document signals received by the control module 22 are coded so that the control module 22 can easily identify the function which is to be performed. The code is preferably one that is easily recognized by the control module processor. For example, if the control module 22 is to transmit document signals to the remote device 16, such as through a facsimile transmission, the document signals received from the host computer 12 are transferred within the control module 22 to the facsimile modem (not shown) which converts the document signals into the appropriate format and then transmits the document signals over a communication medium 24 to the remote device 16. In the preferred embodiment, the communication medium 24 is a telephone link. It is to be understood by those skilled in the art that any suitable communication medium or transmission device can be used such as, but not limited to a modem or a UART. The remote device 16 can be a conventional facsimile or a multifunctional machine, such as, but not limited to a combination copier and facsimile, a combination facsimile and personal computer, or a device capable of scanning, faxing, copying or printing a document.

When a local function is to be performed such as printing or copying a document, the document signals are transmitted from the host computer 12 to the control module 22, which transfers the document signals to the local device 14. In the preferred embodiment, the local device is a multifunctional local peripheral device (MLPD) 14 which is essentially a dumb device that responds only to document signals received from the host computer 12. The MLPD 14 preferably includes scanning means 107, such as a standard optical scanner for optically scanning document information and converting the scanned document information into electrical document signals. The MLPD 14 also includes a recording or printing means 109 such as a standard printer 111 for receiving document signals from the host computer 12 and for producing a recorded form of the document information for example printed document based on the received document signals. In the presently preferred embodiment, the optical scanner is a removable hand held scanner and the printer 111 is a standard LED printer, such as an OL800 printer which is commercially available from Okidata, Inc. It should be recognized that any other type of scanner and/or recording device, such as a film recorder, screen or other such device could alternatively be employed.

An interface 26 is located between the control module 22 and the MLPD 14 for transmitting information in the form of electrical document signals and control signals between the control module 22 and the MLPD 14, such as instructions for performing a particular function or status information. In the preferred embodiment, the interface 26 is a high speed serial video interface but some other appropriate interface, such as a small computer system interface (SCSI) could be employed. As should be understood, the MLPD 14 employs transmitting means 119 and receiving means 121 to respectively transmit and receive data via the interface 26.

Three types of document signals are communicated over the interface 26 from the control module 22 to the MLPD 14. The first type of signals transmitted to the MLPD 14 instruct the MLPD 14 to print a particular document based upon particular document signals received from the host computer 12. The second type of signals transmitted to the MLPD 14 instructs the MLPD 14 to scan a particular document utilizing the scanner and to transmit the document signals from the scanner to the host computer 12. The third type of document signals transmitted to the MLPD 14 act as a command or response communication to the MLPD 14 and include printer, scanner, operator panel and data flow control signals. All commands and responses are transferred between the MLPD 14 and the control module 22 along the same physical connection via the interface 26.

Figure 3:
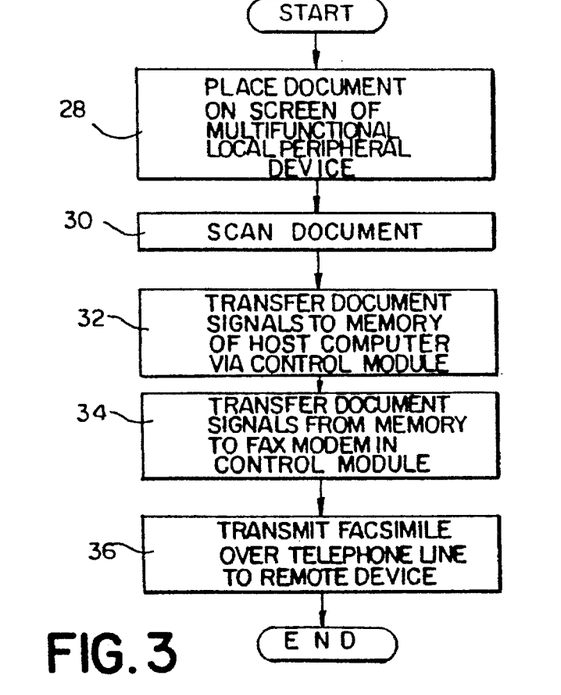
FIG. 3 is a flow chart depicting the facsimile transmission function of the document processing system of FIG. 1.

Referring to FIGS. 3–7, there are shown flow charts depicting a preferred manner for performing the various document processing functions in accordance with the above-described embodiment of the document processing system 10. Referring specifically to FIG. 3, there is shown a flow chart depicting the preferred method by which the document processing system 10 functions to send or transmit a fax of a document to a remote location, such as to the remote device 16. The faxing function begins by placing a document to be faxed on the scanner (not shown) of the MLPD 14 as depicted in block 28 or passing the scanner over the document. The document is scanned and the information from the document is converted by the scanner into electrical document signals in block 30. In the preferred embodiment, the electrical document signals are initially digitized by the scanner and then converted into optical signals. The document signals are then transferred to the memory of the host computer 12 by utilizing the control module 22 in block 32. The host computer 12 determines when the document signals are to be processed and may also maintain a stored copy of the document signals in the memory 101 until a user of the document processing system chooses to delete the document signals. The document signals are also transferred from the memory 101 of the host computer 12 back to the control module 22 in block 34. The control module 22 first determines via the determining means 103 that a facsimile transmission is to be performed and the document signals are transferred to the facsimile modem which is located within the control module 22. The document signals are then transmitted by the control module facsimile modem to the remote device 16 over the communication medium 24 in block 36. A printed copy of the facsimile transmission is produced at the remote device 16 in the manner well-known in the art depending upon the type of remote device 16 being employed.

Figure 4:
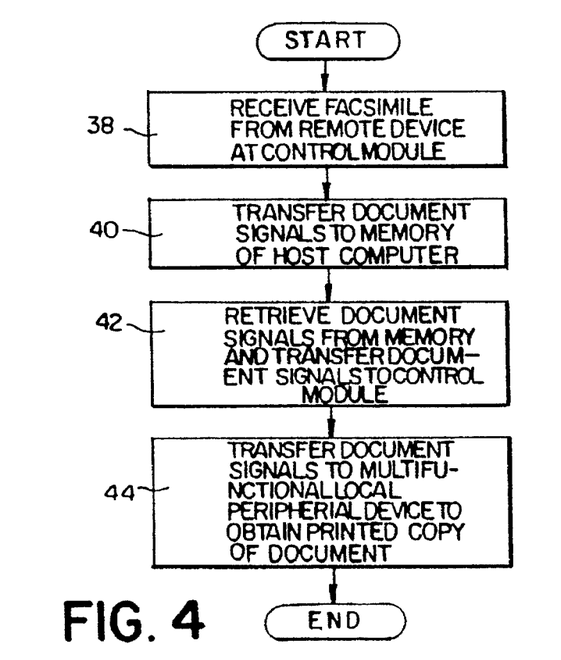
FIG. 4 is a flow chart depicting the facsimile reception function of the document processing system of FIG. 1.

Referring specifically to FIG. 4, there is shown a flow chart depicting the preferred method by which a facsimile is received by the document processing system 10. A facsimile transmitted from the remote device 16 is transmitted as document signals over the communication medium 24 to the control module 22 in block 38. The control module 22 determines whether the received document signals are to be transmitted to the host computer 12 or the MLPD 14. Once the control module 22 detects that the document signals are a facsimile received from the remote device 16, the received document signals are transferred to the memory 101 of the host computer 12 in block 40. If the MLPD 14 is otherwise occupied when a printed copy of the facsimile is to be obtained, the received facsimile document signals can be stored in the host computer memory and retrieved by the user to be viewed on the visual display 18 of the host computer 12. A user can also request that a printed copy of the received facsimile be made if the MLPD 14 is available. The received facsimile document signals are retrieved from the memory of the host computer 12 and are transferred to the control module 22 in block 42. Once the control module 22 determines that the document signals are to be printed the control module 22 transfers the document signals to the MLPD 14 to obtain a printed copy of the document in block 44. In the preferred embodiment, the received facsimile is printed on plain paper. An indicator (not shown) may be associated with the MLPD 14 to indicate to a user that a facsimile has been received. The indicator could either be a visual indicator, such as an LED or other lighted indicator or an audible indicator, such as an audible alarm signal.

Figure 5:
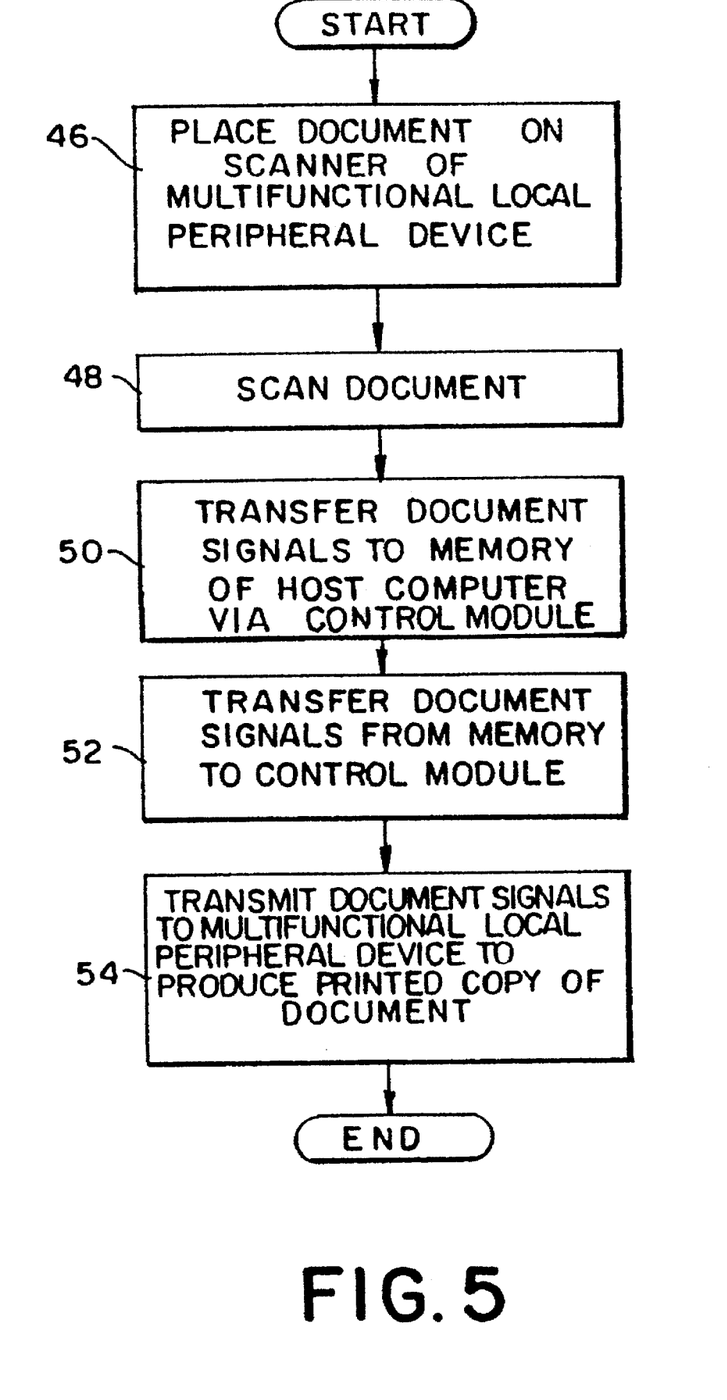
FIG. 5 is a flow chart depicting the copying function of the document processing system of FIG. 1.

Referring specifically to FIG. 5, there is shown a flow chart depicting preferred method of performing the copying function of the document processing system 10. A document to be copied is first placed on the scanner of the MLPD 14 or the scanner is passed over the document in block 46. The document is scanned and the information from the document is converted by the scanner into electrical document signals in block 48. The document signals are transferred from the MLPD 14 to the memory 101 of the host computer 12 via the control module 22 in block 50. The document signals are then transferred from the memory 101 of the host computer 12 to the control module 22 in block 52. Once the control module 22 has determined that a copying function is to be performed, the document signals are transferred from the control module 22 to the MLPD 14 to produce a printed copy of the document at block 54. If multiple copies of the document are to be made or the copies are to be made on a particular sized paper, the document signals are coded to indicate the particular instructions to the MLPD 14 to obtain the desired number or sized copies.

Figure 6:
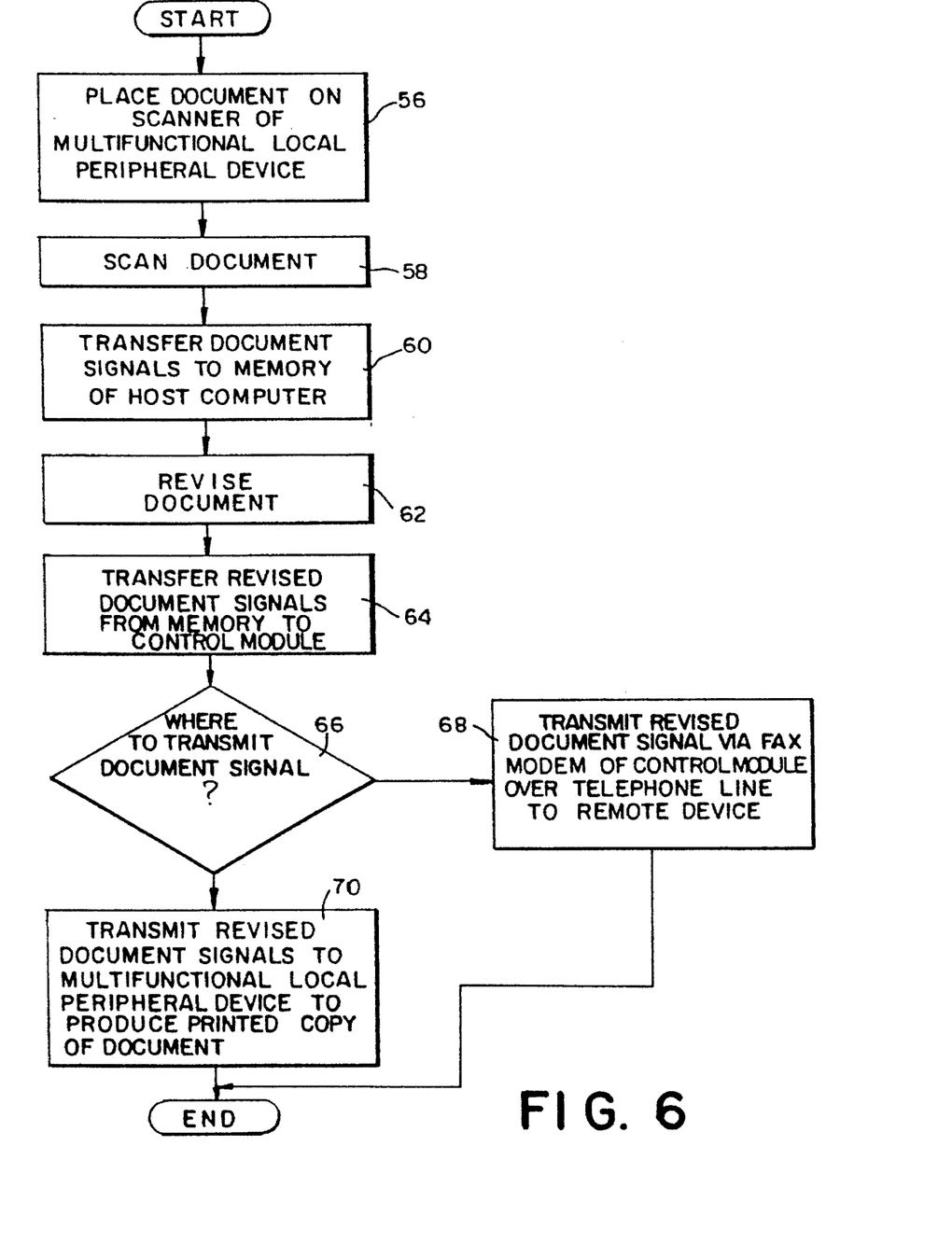
FIG. 6 is a flow chart depicting the scanning and editing functions of the document processing system of FIG. 1.

Referring specifically to FIG. 6, there is shown a flow chart depicting the preferred method of performing the editing function of the document processing system 10. A document is placed on the scanner of the MLPD 14 in block 56. The document is scanned and the information from the document is converted by the scanner into electrical document signals in block 58. The document signals are transferred from the MLPD 14 to the memory of the host computer 12 via the control module 22 in block 60. If the document is to be edited or revised, the document is retrieved from the memory of the host computer 12 and viewed on the visual display 18 of the host computer 12. Once the desired changes have been made to the document, using the keyboard 20, the document may be stored in the memory 101 of the host computer 12 for later use. The document may also be faxed to a remote location or printed. The document signals are transferred to the control module 22 in block 64. The control module 22 determines whether the document signals are to be faxed to the remote device 16 or sent to the MLPD for printing 14 in block 66. If the document signals are to be faxed to the remote device 16, the control module 22 transfers the document signals to the facsimile modem which transmits the document signals over the communication medium 24 to the remote device 16. If the document signals are to be transferred to the MLPD 14 for printing, the control module 22 transmits the document signals to the MLPD 14 to produce a printed copy of the document in block 70.

Figure 7:
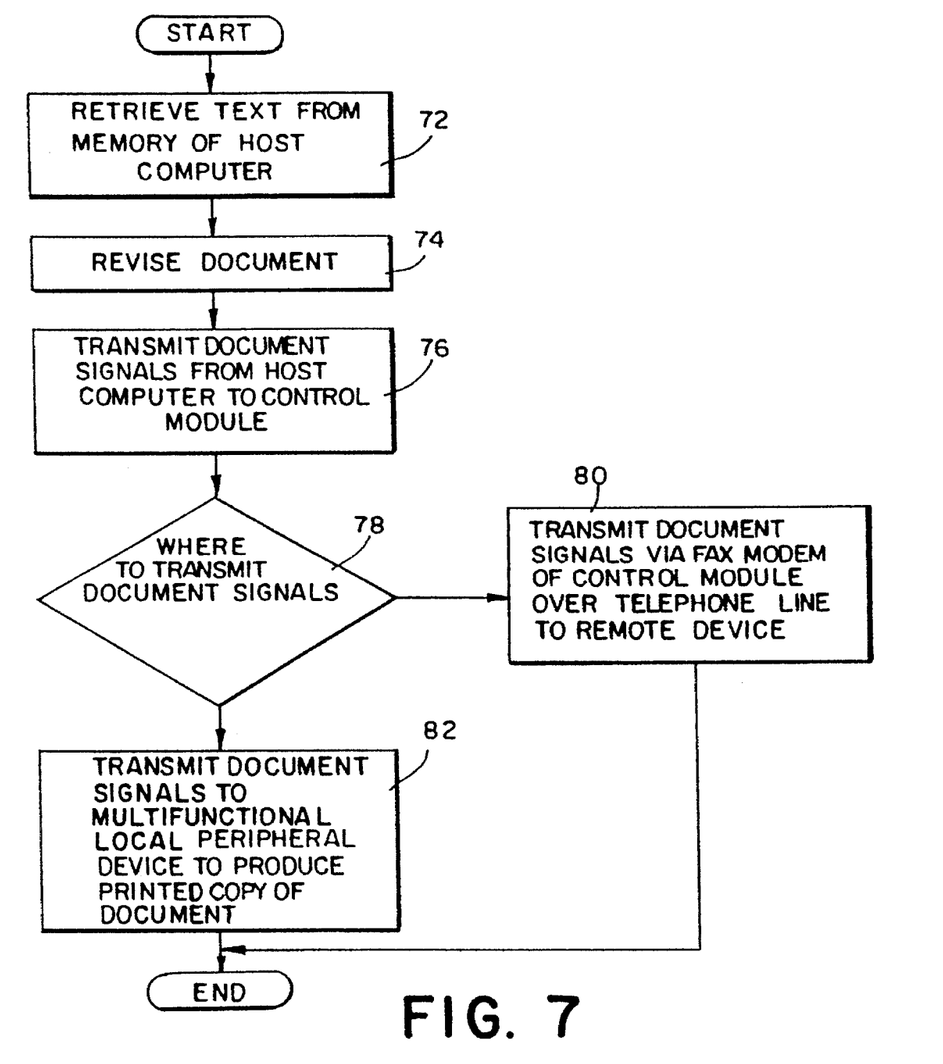
FIG. 7 is a flow chart depicting the editing and printing functions of the document processing system of FIG. 1.

Referring specifically to FIG. 7, there is shown a flow chart depicting the preferred method of performing the printing function of the document processing system 10. A document to be printed is either created in the host computer 12 by using the keyboard 20 or is retrieved from the memory of the host computer 12 in block 72. If revisions are to be made to the document, the document is revised in the host computer 12 in block 74. The document signals are then transmitted from the host computer 12 to the control module 22 in block 76. The control module 22 determines what function is to be performed in block 78. If the function is to fax the document to the remote device 16, the document signals are transferred to the facsimile modem located in the control module 22 which transmits the document signals over the communication medium 24 to the remote device 16 in block 80. If the document is to printed the document signals are transferred from the control module 22 to the MLPD 14 to produce a printed copy of the document in block 82.

From the foregoing description, it can be seen that the present invention is directed to a document processing system 10 which is capable of scanning, faxing, copying and printing a document at either a local device or a remote device. It will be recognized by those skilled in the art that changes may be made to the above-described embodiment of the invention without departing from the broad inventive concepts thereof. It is understood, therefore, that this invention is not limited to the particular embodiments disclosed, but is intended to cover all modifications which are within the scope and spirit of the invention as defined by the appended claims.

We claim:

1. A multifunctional document processing system comprising:

a host computer including a control module disposed therein;

a multifunctional local peripheral device physically separate from but electrically connected to said host computer, said multifunctional local peripheral device including scanning means for optically scanning document information and for converting the scanned document information into first document signals, transmitting means for transmitting the first document signals to the host computer, receiving means for receiving second document signals from the control module, and recording means for producing a recorded form of document information based on the received second document signals;

the control module being interfaced between the host computer and the multifunctional local peripheral device, the control module for receiving the first document signals from the multifunctional local peripheral device and third document signals from a remote device and for sending the received first and third document signals to the host computer, the control module also for receiving the second document signals and fourth document signals from the host computer, for sending the received second document signals to the multifunctional local peripheral device and for sending the received fourth document signals to the remote device, the control module functioning to require that the first document signals from the multifunctional local peripheral device and the third document signals from the remote device be transmitted to the host computer, that the second document signals from the host computer be transmitted to the multifunctional local peripheral device, and that the fourth document signals from the host computer be transmitted to the remote device, the control module further functioning to generate and transmit control signals to the multifunctional local peripheral device, storing means for storing the first document signals received from said multifunctional local peripheral device and the third document signals received from said remote device in a memory within said host computer;

determining means within the host computer for determining a destination for the stored first and third document signals based on the first and third document signals; and retrieving means for retrieving stored first and third document signals from the memory and transmitting the retrieved first and third document signals as the second document signals to the multifunctional local peripheral device or the fourth document signals to the remote device, according to the determining means.

2. The system according to claim 1, wherein the recording means is a printer which produces printed documents.

3. The system according to claim 2, wherein the printer is an LED page printer.

4. The system according to claim 1, wherein the control module further includes memory means for storing the first, second, third add fourth document signals.

5. The system according to claim 1, wherein the host computer can selectively edit the first and second document signals.

6. The system according to claim 1, wherein the control module is a plug in card which may be installed within the host computer.

7. The system according to claim 1, wherein the control module supplements the processing of the document signals as performed by the host computer.

8. The system according to claim 1, wherein the host computer further includes memory means for storing the first and second document signals.

9. A method for utilizing a multifunctional local peripheral device in conjunction with a physically separate electrically connected host computer having a memory for transmitting a facsimile of a document to a remote location, the multifunctional local peripheral device including scanning means for optically scanning document information, the method comprising the steps of:

placing the document on the scanning means of the multifunctional local peripheral device;

scanning the document;

converting the scanned document into electrical document signals;

transferring the document signals to the memory of said separate host computer utilizing a control module within the host computer;

determining a destination for the document signals;

identifying the destination of the document signals to be a facsimile modem;

transferring the document signals from the memory of the host computer to the control module;

transferring the document signals from the control module to the facsimile modem;

transmitting the document signals from the facsimile modem to the remote location; and printing a copy of the document at the remote location based on the transmitted document signals.

10. A method for utilizing a multifunctional local peripheral device in conjunction with a physically separate electrically connected host computer having a memory for receiving a facsimile of a document from a remote location, the multifunctional local peripheral device including printing means for producing a printed document, the method comprising the steps of:

receiving document signals from the remote location over a communication medium at a control module within the host computer;

transferring the document signals from the control module to the memory of said separate host computer;

determining a destination for the document signals;

identifying the destination of the document signals to be the multifunctional local peripheral device;

retrieving the document signals from the memory of the host computer and transferring the document signals to the control module;

transferring the document signals from the control module to the multifunctional local peripheral device destination; and producing a printed copy of the document at the multifunctional local peripheral device.

11. A method for utilizing a multifunctional local peripheral device in conjunction with a physically separate electrically connected host computer for making a copy of a document, the multifunctional local peripheral device including scanning means for optically scanning the document, and printing means for producing the copy, the method comprising the steps of:

placing the document on the scanning means of the multifunctional local peripheral device;

scanning the document;

converting the scanned document into electrical document signals;

transferring the document signals from the multifunctional local peripheral device to a memory of said separate host computer by utilizing a control module within the host computer;

determining a destination for the document signals;

transferring the document signals from the memory of said separate host computer to the control module;

identifying the destination of the document signals be the multifunctional local peripheral device;

transferring the document signals from the control module to the multifunctional local peripheral device destination; and producing the copy of the document.

\* \* \* \* \*